(12) United States Patent
Mirocha

(10) Patent No.: US 11,344,023 B2
(45) Date of Patent: May 31, 2022

(54) POT CALL HAVING SEPARATE SOUND CHAMBERS

(71) Applicant: Joseph Louis Mirocha, Homer Glen, IL (US)

(72) Inventor: Joseph Louis Mirocha, Homer Glen, IL (US)

(*) Notice: Subject to any disclaimer, the term of this patent is extended or adjusted under 35 U.S.C. 154(b) by 140 days.

(21) Appl. No.: 16/883,110

(22) Filed: May 26, 2020

(65) Prior Publication Data
US 2021/0368778 A1 Dec. 2, 2021

(51) Int. Cl.
*A01M 31/00* (2006.01)
*G10K 3/00* (2006.01)

(52) U.S. Cl.
CPC ............. *A01M 31/004* (2013.01); *G10K 3/00* (2013.01)

(58) Field of Classification Search
CPC ........ A01M 31/04; A01M 31/004; G10K 3/00
USPC .......................................... 446/397, 404, 418
See application file for complete search history.

(56) References Cited

U.S. PATENT DOCUMENTS

| | | | | |
|---|---|---|---|---|
| 609,068 A * | 8/1898 | Zeidler | ................ | G10D 13/18 84/415 |
| 4,343,108 A * | 8/1982 | Lee | ................ | A01M 31/004 446/397 |
| 4,586,912 A * | 5/1986 | Adams | ................ | G10K 9/10 446/397 |
| 5,178,575 A * | 1/1993 | Koch | ................ | A01M 31/004 446/170 |
| 5,562,521 A * | 10/1996 | Butler | ................ | A01M 31/004 446/397 |
| 5,607,091 A * | 3/1997 | Musacchia | ................ | A01M 31/004 108/43 |
| 5,716,254 A * | 2/1998 | Bowes | ................ | A01M 31/004 446/397 |
| 6,443,803 B1 * | 9/2002 | Epple, Jr. | ................ | A01M 31/004 446/397 |
| 6,616,504 B1 * | 9/2003 | Forbes | ................ | A01M 31/004 446/418 |
| 6,676,479 B1 * | 1/2004 | Zimmerman | ................ | A01M 31/004 446/397 |
| 6,902,463 B2 * | 6/2005 | Vaicunas | ................ | A01M 31/004 446/397 |
| 7,308,994 B1 * | 12/2007 | Vanicek | ................ | A01M 31/004 206/315.11 |
| 7,353,974 B2 * | 4/2008 | Arndt, III | ................ | A01M 31/004 224/222 |
| 7,785,169 B2 * | 8/2010 | Moss | ................ | A01M 31/004 446/418 |
| 7,980,915 B2 * | 7/2011 | Burcham | ................ | A01M 31/004 446/397 |

(Continued)

*Primary Examiner* — Joseph B Baldori

(57) ABSTRACT

A pot call for producing turkey sounds includes: having separate sound chambers, having a top pot shape on the top, a top open end, a top side wall, a top closed end, a top sound hole aperture or a plurality of top sound hole apertures, having the top open end covered by a top playing surface forming a top sound chamber; and having a bottom pot shape on the bottom, a bottom open end, a bottom side wall, a bottom closed end, a bottom sound hole aperture or a plurality of bottom sound hole apertures, having the bottom open end covered by a bottom playing surface forming a bottom sound chamber. In use a striker is dragged across either the top playing surface or the bottom playing surface creating a turkey sound.

18 Claims, 6 Drawing Sheets

(56) References Cited

U.S. PATENT DOCUMENTS

| | | | | |
|---|---|---|---|---|
| 8,444,106 B1* | 5/2013 | Sloop | ............... | A45F 3/44 |
| | | | | 248/530 |
| 9,414,582 B2* | 8/2016 | Steinmetz | ............ | A01M 31/004 |
| 9,775,338 B2* | 10/2017 | Patton | ................. | A01M 31/004 |
| 10,357,028 B1* | 7/2019 | Stendardi | ............ | A01M 31/004 |
| 10,897,888 B1* | 1/2021 | Walker | .............. | A01M 31/004 |
| 2006/0252341 A1* | 11/2006 | Olinde | ................ | A01M 31/004 |
| | | | | 446/202 |
| 2008/0280525 A1* | 11/2008 | Carr | ................... | A01M 31/004 |
| | | | | 446/397 |
| 2011/0065356 A1* | 3/2011 | Blodgett | ............. | A01M 31/004 |
| | | | | 446/397 |
| 2016/0309700 A1* | 10/2016 | Thomas | .............. | A01M 31/004 |
| 2021/0251214 A1* | 8/2021 | Blodgett | ............. | A01M 31/004 |
| 2021/0368778 A1* | 12/2021 | Mirocha | ................. | G10K 3/00 |

* cited by examiner

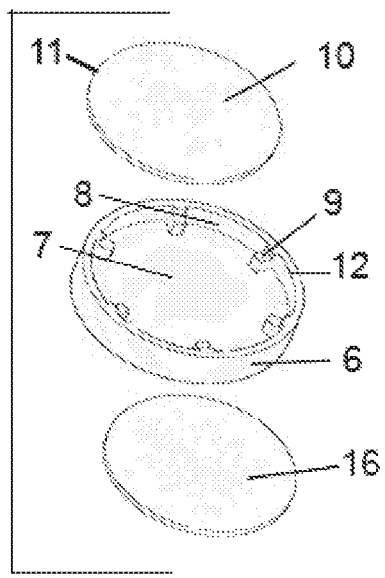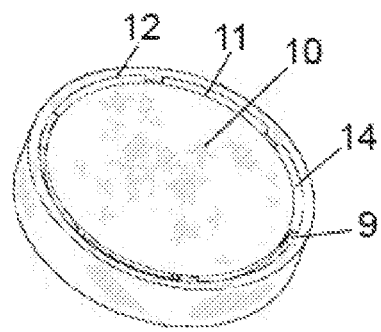
Fig. 2A
Fig. 2B
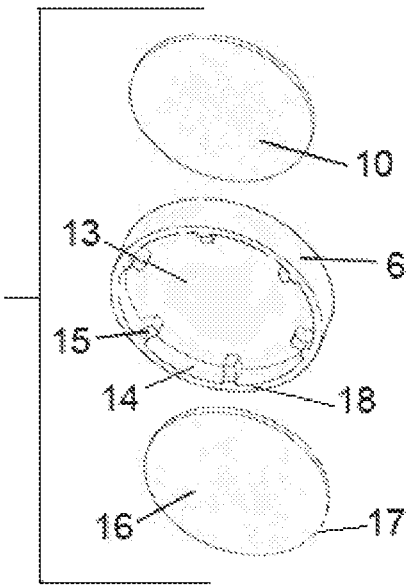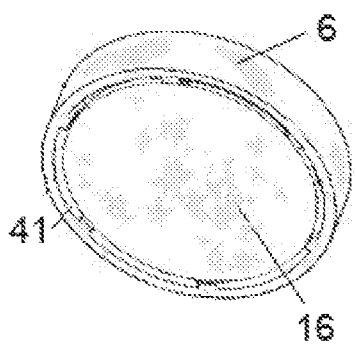
Fig. 2C
Fig. 2D

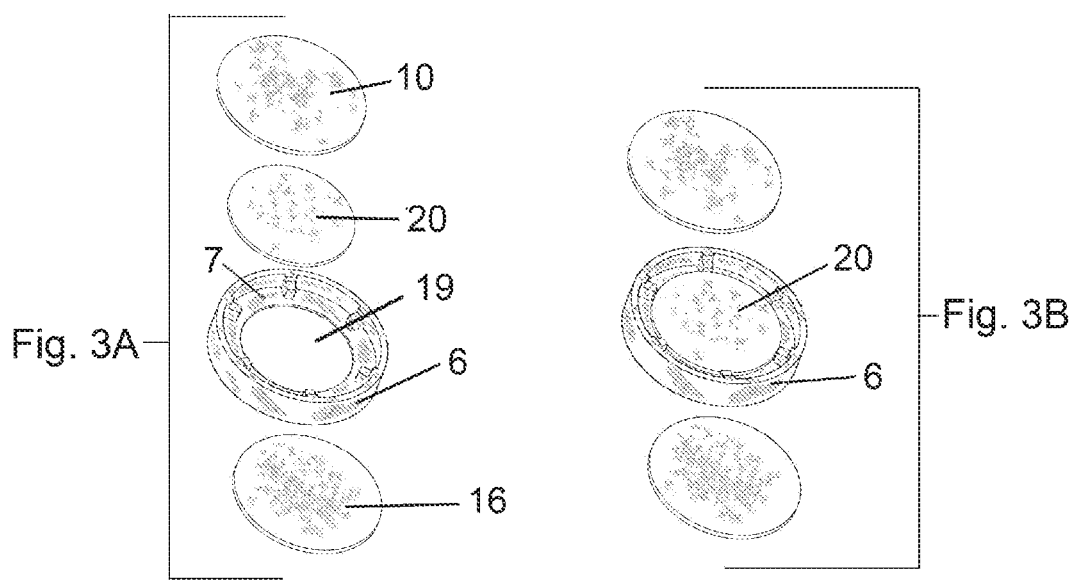

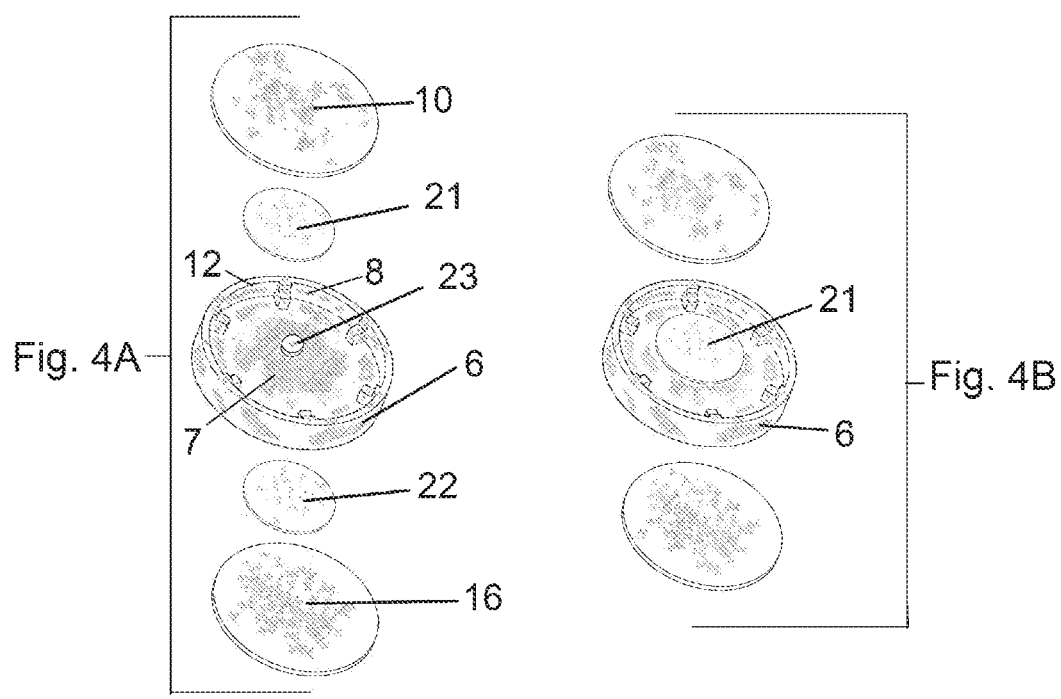

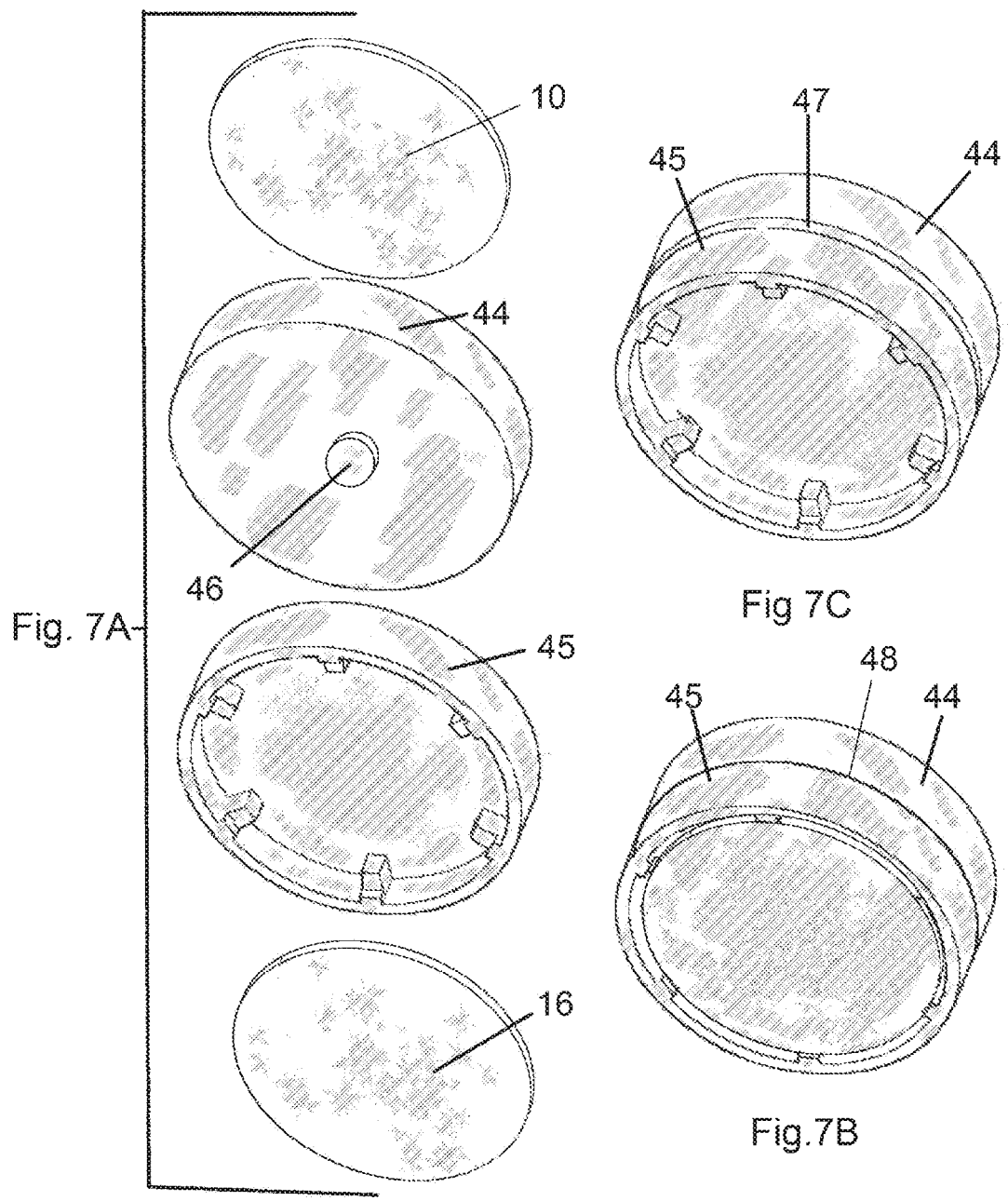

POT CALL HAVING SEPARATE SOUND CHAMBERS

PRIOR ART CITED

U. S. Patent Documents

| | | |
|---|---|---|
| 2,338,816 | January 1944 | Lockhart . . . 84/411 R |
| 3,240,096 | March 1966 | Sloan . . . 84/272 |
| 4,269,104 | May 1981 | Cantos, Jr. |
| 4,387,531 | June 1983 | Jacob . . . 446/397 |
| 4,586,912 | May 1986 | Adams . . . 446/937 |
| 4,662,858 | May 1987 | Hall . . . 446/397 |
| 4,733,808 | March 1988 | Turner et al. . . . 224/219 |
| 4,821,932 | April 1989 | Petryshyn . . . 224/222 |
| 5,244,430 | September 1993 | Legursky . . . 446/397 |
| 5,562,521 | October 1996 | Butler et al. . . . 446/397 |
| 5,607,091 | March 1997 | Musacchia . . . 224/222 |
| 5,716,254 | February 1998 | Bowes |
| 6,057,499 | May 2000 | Basmadjian . . . 84/411 R |
| 6,095,888 | August 2000 | Panepinto . . . 446/397 |
| 6,156,960 | December 2000 | Abrams . . . 84/269 |
| 6,443,803 | September 2002 | Epple, Jr. . . . 446/418 |
| 6,616,504 | September 2003 | Forbes et al. |
| 6,676,479 | January 2004 | Zimmerman . . . 446/397 |
| 6,805,608 | October 2004 | Forbes et al. |
| 6,955,582 | October 2005 | Forbes et al. . . . 446/397 |

STATEMENT REGARDING FEDERALLY SPONSORED RESEARCH OR DEVELOPMENT (Not Applicable)

REFERENCE TO SEQUENCE LISTING, A TABLE, OR A COMPUTER PROGRAM LISTING COMPACT DISC APPENDIX (Not Applicable)

FIELD OF THE INVENTION

The invention relates to the field of game calls and more specifically to an improved pot call having separate sound chambers.

BACKGROUND OF THE INVENTION

Various types of turkey calls have been available for years to enable hunters to attract wild turkey. One type turkey call available in the market is the so-called pot call in which sounds are generated to simulate the sounds made by a wild turkey.

As shown in FIG. 1, a hunter typically holds a pot call 1 in one hand 2 and uses the other hand 3 to drag a striker 4 rubbing on a playing surface 5 covering the open end. When the playing surface 5 is rubbed with a striker 4 the playing surface 5 covering the open end vibrates, producing resonance and overtones of sounds of the hen turkey.

Generally construction of an existing pot call is having a top and having a bottom, having a pot shape, an open end, a closed end, a side wall, having an open end edge and a top playing surface. The top playing surface covering the open end forming a sound chamber, have a sound hole aperture or have a plurality of sound hole apertures (not shown) through the closed end of the pot shape to emanate sound. The pot shape is normally made of wood, plastic, metal, acrylic or casting resin. The top playing surface is normally made from a group of glass, slate, metal, ceramic, wood, friction composite material or solid surface acrylic. A striker normally made of a wood dowel, carbon dowel or acrylic dowel is dragged across the playing surface covering the open end to create a desired sound.

Other models have the sound hole aperture or have the plurality of sound hole apertures through the side wall of the pot call.

Other models are a two sided pot calls have the top playing surface and have a bottom playing surface connected to the inside of the closed end of the pot shape have the sound hole aperture or have the plurality of sound hole apertures through the closed end of the pot shape to emanate sound. This model of pot call is turned over having a large hole in the closed end to put the striker through to play the bottom playing surface on the closed end, offering two different playing surfaces.

Other model pot calls have the sound hole aperture or have the plurality of sound hole apertures through the top playing surface or having the plurality of sound hole apertures through the side wall of the pot shape to emanate sound and use the close end of the pot shape as the playing surface.

Other model pot calls have an internal sounding board in the sound chamber that forms a coupled chamber above and below the internal sounding board enhancing the quality and type of sound produced by the pot call.

A hunter often is in a seated position while hunting, sitting on the ground with his back up against a tree, in this scenario it is desirable for the hunter to be able to rest the pot call on his leg using one hand to play the pot call leaving the other hand free to hold his weapon.

A fundamental problem with the types of existing pot calls discussed above relates to existing pot calls have a single sound chamber limiting functionality.

A significant disadvantage of existing pot calls having the sound hole aperture or having the plurality of sound hole apertures through the closed end of the pot call, is as the hunter holds the pot call in his hand when playing the pot call the sound is emanating downward attenuated by the hunter's hand. Further when in a seated position while hunting, a hunter will rest the pot call on his leg, the hunters leg covers the sound hole apertures attenuating the sound emanating from the sound hole apertures.

A significant disadvantage of existing pot calls which have the sound hole aperture or have the plurality of sound hole apertures through the side wall of the pot shape is when playing the pot call it is difficult to hold the pot call without obstructing the sound hole aperture or the plurality of sound hole apertures with hand and fingers which attenuates the sound. Further the sound emanating from the side wall of the pot call sound hole apertures is directionally outward attenuated by the hunter's body, hand, a hunting blind and foliage.

A significant disadvantage of existing pot calls which only have a top playing surface having the sound hole aperture or the plurality of sound hole apertures through the top playing surface or having the sound hole aperture or the plurality of sound hole apertures through the open end edge is the hunter has only one playing surface.

A significant disadvantage of existing pot calls which have a top playing surface having the sound hole aperture or having the plurality of sound hole apertures through the top playing surface or through the open end edge and have a bottom playing surface is when the hunter turns the pot call over to play the bottom playing surface the sound is emanating downward attenuated by the hunter's hand. Further when playing the bottom playing surface in a seated position while hunting a hunter will rest the pot call on his leg, the hunters leg covers the sound hole apertures attenuating the sound emanating from the sound hole apertures.

A significant disadvantage of existing pot calls having the sound hole aperture or having the plurality of sound hole apertures through the closed end of the pot call, having the bottom playing surface attached to the inside of the close end of the pot shape and having the large hole in the closed end to put the striker through is that it does not allows for the outer periphery of the bottom playing surface to be played. The most realistic turkey sounds are played at the outer periphery of the bottom playing surface. Further when playing the top playing surface the sound is emanating downward attenuated by the hunter's hand. When playing the pot call in a seated position a hunter will rest the pot call on his leg, when playing the top playing surface the hunter's leg is covering the sound hole apertures attenuating the sound emanating from the sound hole apertures.

There remains, therefore, a need for an improved pot call having improved functionality, an improved pot call in which the sound emanating is not attenuated by the hunter's body, hand, leg, hunting blind or foliage, a pot call having two playing surfaces when in a seated position the hunter can rest the pot call on his leg and play either playing surface without the sound being attenuated, a pot call having two separate playing surfaces allowing both playing surfaces to be played to the outer periphery of the playing surfaces.

SUMMARY OF THE INVENTION

Therefore, it is an object of the present invention to provide a pot call having a top playing surface and a bottom playing surface, having both playing surfaces producing a clear sound that resembles the natural call of a wild turkey to lure a turkey. Further having the entire playing surface including outer periphery of both playing surfaces to be playable, a pot call that sound emanated is not attenuated by the hunter's body, leg, hand, hunting blind and foliage.

Another object of this invention is to provide a pot call that produces enhanced sound and volume over existing pot calls.

A related object of this invention is to provide a pot call that can be strapped to the hunter's leg allowing the hunter to play the top playing surface with one hand and be able to turn the pot call over with the same hand to play the bottom playing surface, having the hunters other hand free to hold a weapon.

These and other important aims and objectives are accomplished with a pot call according to the present invention:

Accordingly, a pot call is provided, having a top and having bottom; and having a top pot shape on the top, having a top open end, having a top side wall, having a top closed end, having a plurality of a top connecting means, having a top playing surface edge, having a top playing surface covering the top open end, having the open end of the top pot shape side facing upward, having the top playing surface covering the top open end forming a top sound chamber and having a top sound hole aperture or having a plurality of top sound hole apertures through the top sound chamber.

Further, having a bottom pot shape on the bottom, having a bottom open end, having a bottom side wall having a bottom closed end, having a plurality of a bottom connecting means, having a bottom open end edge, having a bottom playing surface covering the bottom open end, having the open end of the bottom pot shape side facing downward, having the bottom playing surface covering the bottom open end forming a bottom sound chamber and having a bottom sound hole aperture or having a plurality of bottom sound hole apertures through the bottom sound chamber.

The present invention, having the top playing surface and the bottom playing surface allows the pot call to be turned over to play either playing surface and does not attenuate the sound, each producing a different resonance and overtones of sounds.

The present invention, allows for the entire playing surface to be played to the outer periphery on both the top playing surface and the bottom playing surface.

The present invention having two separate sound chambers, the top sound chamber and the bottom sound chamber adds functionality.

The present invention as depicted in the illustrations FIG. 2B (top view) is circular in shape, it can be any pot shape.

The present invention having the top sound chamber for the top playing surface, can have the top sound hole aperture or the plurality of top sound hole apertures through either the top playing surface or have the top sound hole aperture or the plurality of top sound hole apertures through the a top open end edge; and having the bottom sound chamber for the bottom playing surface, can have the bottom sound hole aperture or the plurality of bottom sound hole apertures through either the bottom playing surface or have the bottom sound hole aperture or the plurality of bottom sound hole apertures through the a bottom open end edge. The hunter can hold the pot call in his hand or strap the pot call to his leg and play the top playing surface or turn the pot call over and play the bottom playing surface and the sound is not attenuated by the hunters hunter's body, hand, leg, a hunting blind or foliage; or The present invention having the top sound chamber for the top playing surface, can have the top sound hole aperture or the plurality of top sound hole apertures through the top side wall; and having the bottom sound chamber for the bottom playing surface, can have the bottom sound hole aperture or having the plurality of bottom sound hole apertures through the bottom side wall. The hunter can hold or strap the pot call to his leg and play the top playing surface or turn the pot call over and play the bottom playing surface and the sound is not attenuated by the hunters hunter's leg.

The present invention having the top sound chamber and having the bottom sound chamber allow for the sound hole aperture placement to be the same or to be different for the top sound chamber and for the bottom sound chamber. The shape, size and placement of sound hole apertures is arbitrary.

The present invention the preferred method is to have a plurality of top sound hole apertures formed by having the top playing surface smaller in periphery than the inside diameter of the top open end, having the top playing surface connected by a plurality of a top connecting means to cover the top pot shape said top open end. The space between the top playing surface, inside diameter of the top open end and the plurality of a top connecting means forms the plurality of top sound hole apertures; and to have the plurality of bottom sound hole apertures formed by having the bottom playing surface smaller in periphery than the inside diameter of the bottom open end, having the bottom playing surface connected by the plurality of a bottom connecting means to cover the bottom pot shape said bottom open end. The space between the bottom playing surface, inside diameter of the bottom open end and the plurality of the bottom connecting means forms the plurality of bottom sound hole apertures. The hunter plays the top playing surface having the plurality of top sound hole apertures facing up, to play the bottom playing surface the pot call is turned over having the bottom side plurality of bottom sound hole apertures facing up, when playing either top playing surface or the bottom playing surface the sound is projected upward not attenuated by the hunter's body, hand, leg, a hunting blind or surrounding foliage.

The present invention, the top pot shape and the bottom pot shape can be a single housing or two separate pot shape housings having a separate top pot shape and having a separate bottom pot shape; and when having the separate top pot shape and having the separate bottom pot shape, having a pot connecting means or a plurality of pot connecting means to connect the separate top pot shape to the separate bottom pot shape to each other can be used, the pot connecting means or the plurality of pot connecting means can abuts the separate top pot shape to the separate bottom pot shape. The pot connecting means can connect the separate top pot shape and the separate bottom pot shape in a permanent manner to be used as single pot call or can connect the separate top pot shape and the separate bottom pot shape in a provisional manner using the pot call as single pot call or as two standalone pot calls: or when having the separate top pot shape and having the separate bottom pot shape, a pot connecting means or a plurality of pot connecting means to connect the top pot shape to the bottom pot shape to each other can be used, the pot connecting means or the plurality of pot connecting means can leave a space between the separate top pot shape and the separate bottom pot shape. The pot connecting means can connect the separate top pot shape and the separate bottom pot shape in a permanent manner to be used as single pot call; or can connect the separate top pot shape and the separate bottom pot shape in a provisional manner used as a single pot call or used as two standalone pot calls.

The present invention the pot connecting means or the plurality of pot connecting means can be a separate part or an integral part of the separate top pot shape and the separate bottom pot shape.

The present invention the pot connecting means or the plurality of pot connecting means that abuts the separate top pot shape to the separate bottom pot shape part can be used to retrofit other manufactured pot calls not having sound hole apertures on the bottom side of the pot calls, joining two other manufactured pot calls to be used as a single pot call; and the pot connecting means or the plurality of pot connecting means that leave a space between the separate top pot shape and the separate bottom pot shape can be used to retrofit other manufactured pot calls having sound hole apertures on the bottom side of the pot calls, joining two other manufactured pot calls pot calls to be used as a single pot call, sound emanating from the sound hole apertures on the bottom side of the two pot calls is reflected out said space between the connected pot calls.

The preferred method is to have the pot shape on the top side and the pot shape on the bottom side as a single housing.

The present invention, the playing surface composition is made from a group of glass, slate, metal, ceramic, wood, friction composite material or solid surface acrylic material. The composition of the playing surface affects the resonance and overtones of sounds and can be the same or different on the top pot shape and pot shape on the bottom pot shape.

The present invention, can have a sound board which creates a coupled chamber above and below it affecting the resonance and overtones of sounds, the top pot shape can have a top internal sounding board in the top pot shape and the bottom pot shape can have a bottom internal sounding board in the bottom pot shape. The sound board composition is made from a group of glass, slate, metal, ceramic, wood or solid surface acrylic material. The composition of the sound board affects the resonance and overtones of sounds and can be the same or different on the pot shape on the top side and pot shape on the bottom side.

The present invention provides a means to connect a removable strap to strap the pot call to a hunter's leg with a stretchy strap allowing the user to play the pot call with one hand, to lift and turn the pot call over to play the other side playing surface with the same hand leaving the other hand free to hold a weapon. The connecting means can also be used to connect one end of a lanyard to the pot call having the other end of the lanyard to hang the pot call around the hunter's neck or from his belt.

The above and other features of the invention, including various novel details of construction and combinations of the parts, will now be more particularly described with reference to the accompanying drawings and printed out in the claims. The invention is shown by way of illustration only and not as a limitation of the invention. The principles and features of the invention can be employed in various and numerous embodiments without departing from the scope of the invention.

BRIEF DESCRIPTION OF SEVERAL VIEWS OF THE DRAWINGS

FIG. 2A is an exploded top view of the present invention.

FIG. 2B is a top view of the present invention assembled.

FIG. 2C is an exploded bottom view of the present invention.

FIG. 2D is a bottom view of the present invention assembled.

FIG. 3A is an exploded top view of the present invention having an alternative chamber plate.

FIG. 3B is an exploded top view of the present invention having an alternative chamber plate in place.

FIG. 4A is an exploded top view present invention having an alternative sound board.

FIG. 4B is an exploded top view of the present invention having an alternative sound board in place.

FIG. 7A is an exploded bottom view of the present invention having an alternative having the housing being two parts.

FIG. 7B is a bottom view of the present invention having an alternative having the housing being two parts connected to abut.

FIG. 7C is a bottom view of the present invention having an alternative having the housing being two parts connected to have a space between the parts.

DETAILED DESCRIPTION

Figure 1:
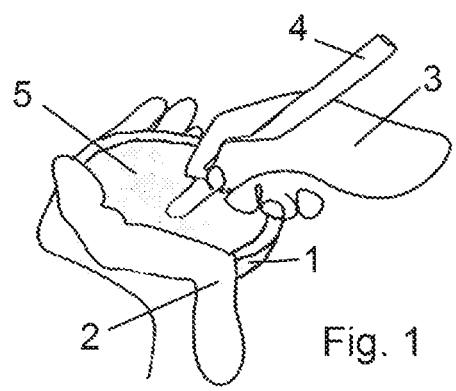
FIG. 1 is a pot call held in one hand and being played with a striker by the other hand.

This invention is applicable to the calling of turkeys and other various animals, including predator animals. Therefore, without limiting the applicability of the invention to pot calls, the invention will be described in such environment.

With reference to the drawings, a pot call of the present invention will be described:

FIG. 2A (top view) shows a pot call having a housing 6, having a top and having a bottom, having a top pot shape on the top side of the housing 6, having a top pot shape having a top closed end 7, having a top side wall 8, having a plurality of top connecting means 9, having a top playing surface 10, having a top playing surface edge 11, having a top open end and having a top inside of open end 12, having a top sound hole apertures (FIG. 2B 14), having a top open end edge (FIG. 5A 24), having a top sound chamber and having the top open end with the top open end of the top pot shape facing upward.

FIG. 2B (top view) shows the top pot shape on the top of the housing 6 assembled, the top playing surface 10 is connected to the top open end of the top pot shape by the plurality of top connecting means 9 covering the top open end of the top pot shape. The top side wall (FIG. 2A 8) and the top closed end (FIG. 2A 7) covered by the top playing surface 10 form the top sound chamber. The periphery of the top playing surface 11 is smaller than the perimeter of the top inside of open end 12. There is a space between the top inside open end 12, the top playing surface edge 11 and the plurality of top connecting means 9 forming the plurality of upward facing top sound hole apertures 14 through the top sound chamber which emanates turkey sound when the top playing surface 10 is played by the hunter. The top playing surface edges 11 between the plurality of top connecting means 9 are not connected to the top pot shape having the top playing surface edge 11 between the plurality of top connecting means 9 resonating freely, increasing the volume, quality and type of sound produced by the pot call.

FIG. 2C (bottom view) shows the pot call having a housing 6, having a top and having a bottom, having a bottom pot shape on the bottom side of the housing 6, having a bottom pot shape having a bottom closed end 13, having a bottom side wall 14, having a plurality of bottom connecting means 15, having a bottom playing surface 17, having a bottom playing surface edge 17, having a bottom open end and having a bottom inside of open end 18, having a bottom sound hole apertures (FIG. 2D 41), having a bottom open end edge (FIG. 5B 27), having a bottom sound chamber and having the bottom open end with the bottom open end of the bottom pot shape facing downward.

FIG. 2D (bottom view) shows the bottom pot shape on the bottom side of the housing 6 assembled, the bottom pot shape is similarly assembled as the top pot shape, having the same attributes.

The pot call said housing (FIG. 2D) 6 is normally made of wood, plastic, metal, acrylic or casting resin to fabricate a turkey call pot The pot call is two sided, the top playing surface (FIG. 2B 10) and the bottom playing surface (FIG. 2D 16), the pot call is turned over to play either playing surface.

The pot call has two separate sound chambers, the playing surface 10 operatively coupled to the top sound chamber and the bottom playing surface 16 operatively coupled to the bottom sound chamber.

FIG. 2B (top view) shows the pot call circular in shape, it can be any pot shape.

The pot call having the top playing surface 10 operatively coupled to the top sound chamber and having the bottom playing surface 16 operatively coupled to the bottom sound chamber allows the hunter to hold the pot call in his hand and the sound is not attenuated when playing either the top playing surface 10 or the bottom playing surface 16.

The pot call having the top playing surface 10 operatively coupled to the top sound chamber and having the bottom playing surface 16 operatively coupled to the bottom sound chamber allows the hunter to hold or strap the pot call to his leg and play the top playing surface 10 or turn the pot call over and play the bottom playing surface 16 of the pot call and the sound is not attenuated when playing either the top playing surface 10 or the bottom playing surface 16.

The pot call playing surface is normally made from a group of glass, slate, metal, ceramic, wood, friction composite material or solid surface acrylic. The composition and thickness of the playing surface affects the sound. The composition and thickness of the top playing surfaces 10 and the bottom playing surface 16 can be the same or different.

The top connecting means (FIG. 2A 9) and the bottom connecting means (FIG. 2C 15) can be an integral part of the housing (FIG. 2A 6) or a separate part. Connecting the playing surfaces (FIG. 2A 10) to the connecting means (FIG. 2A 9) and connecting playing surface (FIG. 2C 16) to the connecting means (FIG. 2C 15) is accomplished by adhesive, glue, epoxy or mechanical means.

FIG. 3A (top view) is an alternative embodiment of the present invention, shows the top closed end 7 of the top pot shape of the housing 6 having a chamber plate aperture 19 and having a sound chamber plate 20 made of a material that reflects sound. The sound chamber plate is preferred to be made from a group of glass, slate, metal, ceramic, or solid surface acrylic. The sound chamber plate 20 is connected with adhesive, glue, epoxy or by mechanical means to the top closed end 7 of the top pot shape of the housing 6 covering chamber plate aperture 19; and FIG. 38 (top view) shows the sound chamber plate 20 connected to the top pot shape on of the housing 6 covering chamber plate aperture (FIG. 3A 19). If the pot call is made of wood or other sound deadening material which does not reflect sound waves efficiently, a sound chamber plate 20 is provided to reflects and bounce sound waves.

FIG. 4A (top view) is an alternative embodiment of the present invention, having an internal top sounding board 21 to be mounted in the top pot shape, having an internal bottom sounding board 22 to be mounted in the bottom pot shape. The internal top sounding board 21 is smaller in periphery than the perimeter of the inside of top open end 12. Having a raised connecting means 23 connected to the top closed end of the top pot shape. The internal sounding board 21 is connected to the raised connecting means 23 having a space between the bottom side of the internal sounding board 21 and the top closed end 7, having a space between top side of the internal sounding board 21 and bottom side of top playing surface 10, having a space between periphery of the internal sound board 21 and the top side wall 8 creating a coupled sound chamber above and below the internal sound board 21; and FIG. 4B (top view) shows the internal sounding board 21 assembled in place. Connecting the internal sound board 21 to the raised connecting means (FIG. 4A 23) is accomplished by adhesive, glue, epoxy or mechanical means. The raised connecting means (FIG. 4A 23) can be a single raised connecting means or a plurality of raised connecting means. The internal sounding board is preferred to be made from a group of glass, slate, metal, ceramic, wood or solid surface acrylic.

FIG. 4A (top view) shows having an internal sounding board 22 that is to be mount in the bottom pot shape, the internal sounding board 22 is similarly assembled in the bottom pot shape as is the sounding board 21 in the top pot shape, having the similar attributes.

Figure 5A:
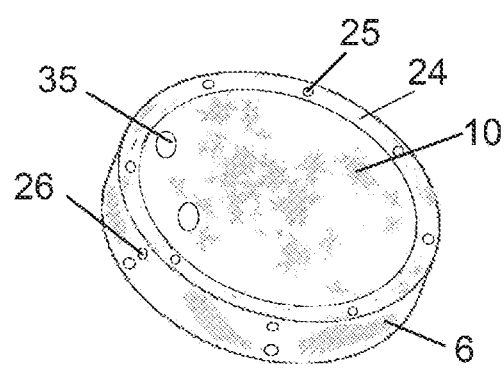
FIG. 5A is a top view of the present invention having an alternative having a top playing surface enclosing the top and having sound hole apertures.
Figure 5B:
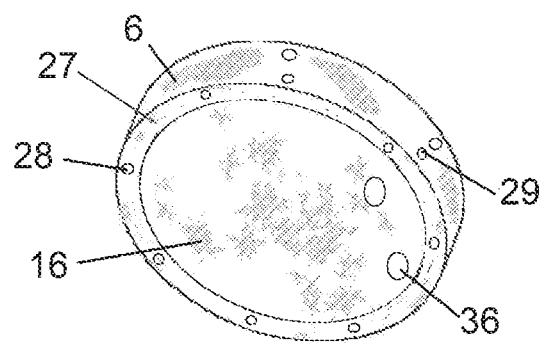
FIG. 5B is a bottom view of the present invention having an alternative having a bottom playing surface enclosing the bottom and having sound hole apertures.

FIG. 5A (top view) is an alternative embodiment of the present invention having the top pot shape having the top open end completely enclosed by the top playing surface 10 creating the top sound chamber. Further having a top sound hole aperture or having a plurality of top sound hole apertures 35 through the top playing surface 10, or a top sound hole aperture or having a plurality of top sound hole apertures 25 through the top side open end edge 24, or a top sound hole aperture or having a plurality of top sound hole apertures 26 through the top side wall, of the pot call emanating sound from the top sound chamber when the top playing surface 10 is played; and FIG. 5B (bottom view) is an alternative embodiment of the present invention having the bottom pot shape having the bottom open end completely enclosed by the bottom playing surface 10 creating the top sound chamber. Further having a bottom sound hole aperture or having a plurality of bottom sound hole apertures 36 through the bottom playing surface 16, or a bottom sound hole aperture or having a plurality of bottom sound hole apertures 28 through the bottom side open end edge 27, or a bottom sound hole aperture or having a plurality of bottom sound hole apertures 29 through the bottom side wall, of the pot call emanating sound from the bottom sound chamber when the bottom playing surface 16 is played; and the pot call having a sound chamber for the top playing surface 10 and having a sound chamber for the bottom playing surface 16 allows the hunter to hold or strap the pot call to his leg and play the top playing surface 10 or turn the turkey pot over and play the bottom playing surface 16 of the pot call, and the sound is not attenuated by the hunters leg when playing either the top playing surface 10 or the bottom playing surface 16.

Figure 6:
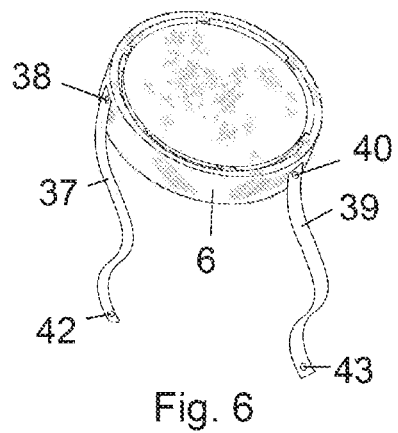
FIG. 6 is a top view of the present invention having straps to strap the present invention to a hunter's leg.

FIG. 6 (top view) is an alternative embodiment of the present invention having straps attached to opposite sides of the exterior of the housing 6. Having a left strap 37 connected to the housing 6 by a left provisional side connecting means 38 and having a right strap 39 connected to the housing 6 by a right side provisional connecting means 40 by a screw, a clip, a peg, a snap, magnets or other mechanical mean; and the left strap 37 having a left removable connecting means 42 and right strap 39 having a right removable connecting means 43 to join both straps to each other. The left strap 37 and the right strap 39 are placed around hunter's limb, leg, arm, wrist or a an object such as a tree to secure the pot call in a position which allows hunter to play the playing surface with one hand leaving the other hand free to hold a weapon. The left strap 37 and the right strap 39 are to be of a stretchy material such as elastic or rubber to allow the user with one hand lift the pot call, turn the pot call over to play the other side of the pot call leaving the other hand free to hold a weapon. The left side connecting means 38 and the right side connecting means 40 can be used to connect a lanyard (not shown).

FIG. 7A (bottom view) is an alternative embodiment of the pot call of the present invention having the pot call as two separate pot shapes, having a separate top pot shape 44 facing upward and having a separate bottom pot shape 45 facing downward; and FIG. 7C (bottom view) shows the separate top pot shape 44 and the separate bottom pot shape 45 joined with a space 47 between pot shapes, (FIG. 7A) shows a pot connecting means 46. The separate top pot shape 44 and the separate bottom pot shape are joined by the pot connecting means or a polarity of pot connecting means 46 that leave a space 47 between the separate top pot shape 44 and the separate bottom pot shape 45. The connecting means 46 can be integral to the separate top pot shape 44 and the separate bottom pot shape 45 or be a separate part such as screws, clips, hook and loop fastener, adhesive, glue, epoxy, magnets, two sided tape or other mechanical means, sized to leave the said space. Said connecting means 46 can join separate top pot shape 44 and the separate bottom pot shape 45 in either a permanent manner or in a provisional manner. Said connecting means 46 that joins and leaves a space between the separate top pot shape 44 and the separate bottom pot shape 45 can be used to retrofit other manufactured pot calls having sound whole apertures on the bottom side of the pot calls, joining two other manufactured pot calls pot calls to be used as a single apparatus. Sound emanating from the sound hole apertures on the bottom side of the turkey calls is reflected out said space between the joined turkey calls; and FIG. 7B (bottom view) shows the separate top pot shape 44 and the separate bottom pot shape 45 joined to abut, (FIG. 7A) shows a pot connecting means 46. The separate top pot shape 44 and the separate bottom pot shape are joined by the pot connecting means or a polarity of pot connecting means 46 that abut separate top pot shape 44 and the separate bottom pot shape 45. The connecting means 46 can be integral to the separate top pot shape 44 and the separate bottom pot shape 45 or be a separate part such as screws, clips, hook and loop fastener, adhesive, glue, epoxy, magnets, two sided tape or other mechanical means. Said connecting means 46 can join separate top pot shape 44 and the separate bottom pot shape 45 in either a permanent manner or in a provisional manner. The connecting means 46 can be used to retrofit other manufactured pot calls having sound hole aperture on the side or top of the pot calls, joining two other manufactured pot calls pot calls to be used as a single pot call.

What is claimed is:

1. A pot call having a plurality of separate sound chambers comprising: having a top and having a bottom; on the top having a top pot shape with said top pot shape having a top open end with said top open end facing upward; and on the bottom having a bottom pot shape with said bottom pot shape having a bottom open end with said bottom end facing downward; and said top pot shape having a top side wall, having a top open end edge, having a top closed end, having a top playing surface connected to the top open end, having the top playing surface covering the top open end forming a top sound chamber, having a top sound hole aperture or having a plurality of top sound hole apertures, having a striker to drag across said top playing surface for vibrating the top playing surface thereby generating a turkey sound through vibration of the top playing surface; and said bottom pot shape having a bottom side wall, having a bottom open end edge, having a bottom closed end and having a bottom playing surface connected to said bottom open end, having the bottom playing surface covering the bottom open end forming a bottom sound chamber, having a bottom sound hole aperture or having a plurality of bottom sound hole apertures, having the striker to drag across said bottom playing surface for vibrating the bottom playing surface thereby generating a turkey sound through vibration of the bottom playing surface; and the top pot shape having a plurality of top connecting means connecting the top playing surface to the top pot shape at a number of points; the top playing surface is smaller in periphery than the perimeter of the inside of the top open end of the top pot shape forming a plurality of spaces between the perimeter of the inside of the top open end of the top pot shape; the plurality of spaces are said plurality of top sound hole apertures, when the striker is dragged across the top playing surface sound emanates through said plurality of top sound hole apertures, having the top playing surface playable to the outer most periphery; and the bottom pot shape having a plurality of bottom connecting means connecting the bottom playing surface to the bottom pot shape at a number of points; the bottom playing surface is smaller in periphery than the perimeter of the inside of the bottom open end of the bottom pot shape forming a plurality of spaces between the perimeter of the inside of the bottom open end of the bottom pot shape, the plurality of spaces are said plurality of bottom sound hole apertures, having the bottom playing surface playable to the outer most periphery, when the striker is dragged across the bottom playing surface sound emanates through said plurality of bottom sound hole apertures.

2. Said pot call apparatus of claim 1 further comprising: the top pot shape having the top playing surface covering and enclosing the top pot shape, having an additional top sound hole aperture or having a plurality of additional top sound hole apertures through the top playing surface, said additional top sound hole aperture or said additional top sound hole apertures emanate sound when the striker is dragged across the top playing surface; and the bottom pot shape having the bottom playing surface covering and enclosing the bottom pot shape, having an additional bottom sound hole aperture or having a plurality of additional bottom sound hole apertures through the bottom playing surface, said additional bottom sound hole aperture or said additional bottom sound hole apertures emanate sound when the striker is dragged across the bottom playing surface.

3. Said pot call apparatus of claim 1 further comprising: the top pot shape having the top playing surface covering and enclosing the top pot shape, having an additional top sound hole aperture or having a plurality of additional top sound hole apertures through the top side wall, said additional top sound hole aperture or said plurality of additional top sound hole apertures emanate sound when the striker is dragged across the top playing surface; and the bottom pot shape having the bottom playing surface covering and enclosing the bottom pot shape, having an additional bottom sound hole aperture or having a plurality of additional bottom sound hole apertures through the bottom side wall, said additional bottom sound hole aperture or said plurality of additional bottom sound hole apertures emanate sound when the striker is dragged across the bottom playing surface.

4. Said pot call apparatus of claim 1 further comprising: the top pot shape having the top playing surface covering and enclosing the top pot shape, having an additional top sound hole aperture or having a plurality of additional top sound hole apertures through the top open end edge, said additional top sound hole aperture or said plurality of additional top sound hole apertures emanate sound when the striker is dragged across the top playing surface; and the bottom pot shape having the bottom playing surface covering and enclosing the bottom pot shape, having an additional bottom sound hole aperture or having a plurality of additional bottom sound hole apertures through the bottom open end edge, said additional bottom sound hole aperture or said plurality of additional bottom sound hole apertures emanate sound when the striker is dragged across the bottom playing surface.

5. Said pot call apparatus of claim 1 further comprising: the top pot shape having a chamber plate aperture and having a sound chamber plate to reflect sound mounted to the top pot shape covering the chamber plate aperture.

6. Said pot call apparatus of claim 1 further comprising: the top pot shape and the bottom pot shape each or either having a sound chamber plate to reflect sound.

7. Said pot call apparatus of claim 1 wherein the top pot shape and the bottom pot shape are one housing.

8. Said pot call apparatus of claim 1 where in the top pot shape and the bottom pot shape are separate housings, having a separate top pot shape and having a separate bottom pot shape.

9. Said pot call apparatus of claim 8 further comprising: said top pot shape and said bottom pot shape are joined having a pot connecting means or having a plurality of pot connecting means to connect said top pot shape and said bottom pot shape to abut, connected to be used as a single pot call.

10. Said pot call apparatus of claim 9 wherein said pot connecting means can be a: screw, clip, peg, snap, hook and loop fastener, magnets, adhesive, glue, epoxy or other mechanical means or having a plurality of: screw, clip, peg, snap, hook and loop fastener, magnets, adhesive, glue, epoxy or other mechanical means.

11. Said pot call apparatus of claim 9 wherein having said pot connecting means makes a permanent connection or makes a provisional connection.

12. Said pot call apparatus of claim 8 further comprising: the top pot shape and the bottom pot shape are joined having a pot connecting means or having a plurality of pot connecting means connecting the top pot shape and the bottom pot shape with a space between the top pot shape and the bottom pot shape, connected to be used as a single pot call; and having an additional top sound hole aperture or a plurality of additional top sound holes apertures in said closed end of said top pot shape, when the striker is dragged across the top playing surface sound emanates through said additional top sound hole aperture or said plurality of additional top sound hole apertures; and having an additional bottom sound hole aperture or a plurality of additional bottom sound holes apertures in said closed end of said bottom pot shape, when the striker is dragged across the bottom playing surface sound emanates through said additional bottom sound hole aperture or said plurality of additional bottom sound hole apertures.

13. Said pot call apparatus of claim 12 wherein said pot connecting means can be a: screw, clip, peg, snap, hook and loop fastener, magnets, adhesive, glue, epoxy or other mechanical means or having a plurality of: screw, clip, peg, snap, hook and loop fastener, magnets, adhesive, glue, epoxy or other mechanical means.

14. Said pot call apparatus of claim 12 wherein said pot connecting means makes a permanent connection or makes a provisional connection.

15. Said pot call apparatus of claim 1 further comprising: the top pot shape having a internal top sound board operationally coupled to the top pot shape closed end; and the bottom pot shape having a internal bottom sound board operationally coupled to the bottom pot shape closed end.

16. Said pot call apparatus of claim 1 wherein the top playing surface and the bottom playing surface are made from a group of: glass, slate, metal, ceramic, wood, friction composite material, or solid surface acrylic.

17. Said pot call apparatus of claim 1 wherein the top pot shape and the bottom pot shape are made from a group of wood, plastic, metal, acrylic or casting resin.

18. Said pot call apparatus of claim 1 further comprising: having a left strap connected to said pot call, having a left side removable connecting means to connect said left strap to the pot call; and
    having a right strap connected to the pot call, having a right side removable connecting means to connect said right strap to the pot call.

\* \* \* \* \*